United States Patent Office 2,871,277
Patented Jan. 27, 1959

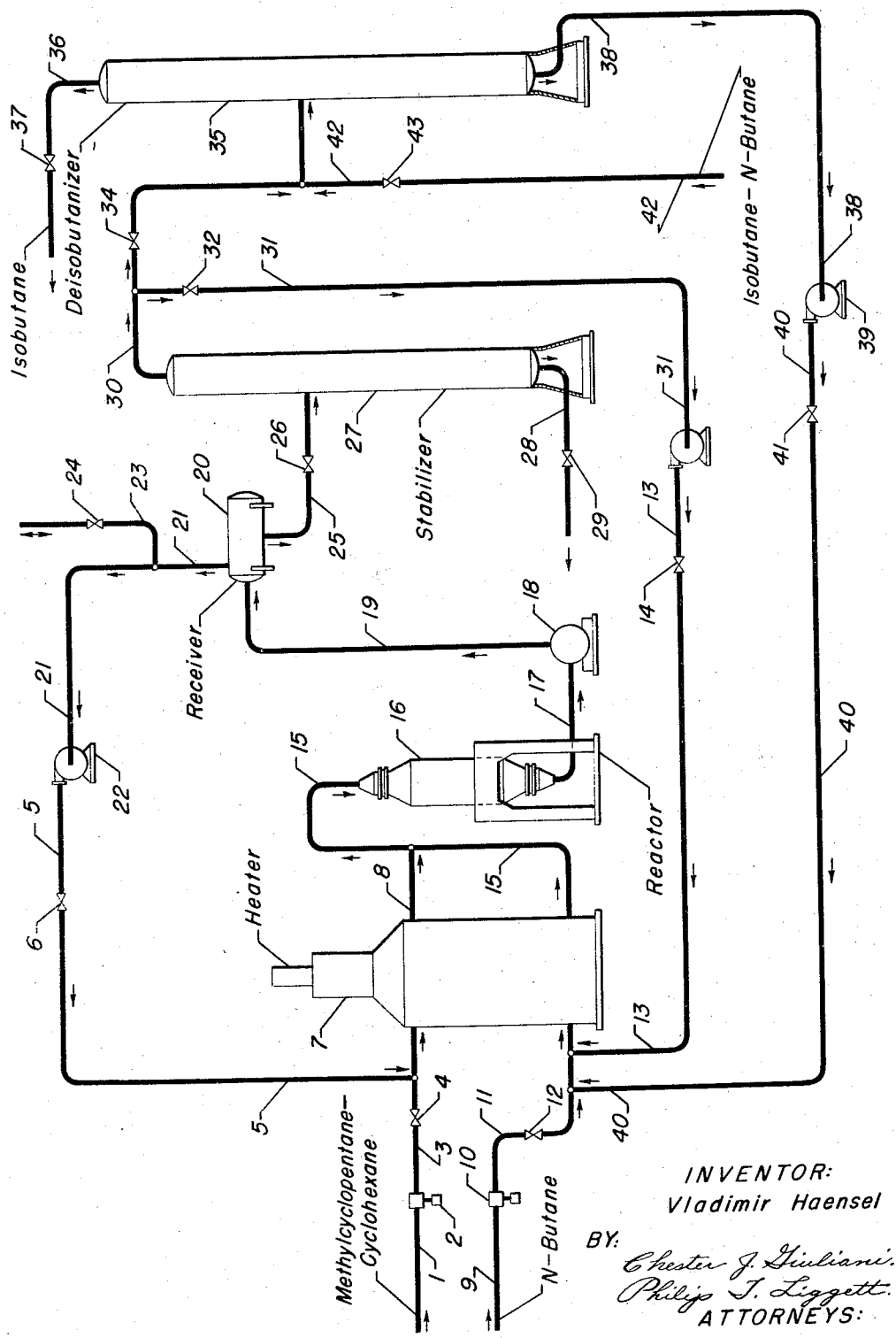

2,871,277

HYDROCARBON CONVERSION PROCESS

Vladimir Haensel, Hinsdale, Ill., assignor to Universal Oil Products Company, Des Plaines, Ill., a corporation of Delaware Application March 9, 1956, Serial No. 570,524

8 Claims. (Cl. 260—683.68)

This application is a continuation-in-part of my copending application Serial No. 202,043, filed December 21, 1950, now abandoned, which is a continuation-in-part of my application Serial No. 140,945, filed July 27, 1950, now abandoned, which was a continuation-in-part of my application Serial No. 41,671, filed July 30, 1948, now abandoned, and of my application Serial No. 99,868, filed June 17, 1949, now abandoned, which was a division of my application Serial No. 788,673, filed November 28, 1947, now U. S. Patent No. 2,479,110, issued August 16, 1949.

This invention relates to the catalytic conversion of hydrocarbon fractions. It is more specifically concerned with a particular method of isomerizing low boiling hydrocarbons and simultaneously reforming gasoline boiling range hydrocarbon fractions in the presence of hydrogen and platinum-alumina-combined halogen catalysts.

Catalysts comprising platinum-alumina and halogen, particularly chlorine and fluorine, are especially useful in promoting the isomerization of saturated hydrocarbons, particularly lower boiling isomerizable paraffins, and, in addition, these catalysts exhibit the characteristics of long life that they have shown to attain in reforming processes. I have invented a process to utilize the properties of these catalysts in a manner such that isomerizing reactions are conducted simultaneously with reforming with resultant savings in catalyst cost thereby and in addition, attainment of enhanced product distribution.

These catalysts are also effective in promoting the reforming of hydrocarbons. Hydrocracking of paraffins and dehydrogenation of naphthenes are among the predominant reactions that are promoted by these catalysts, which are capable of increasing the octane number of straight-run gasolines and naphthas to values that are substantially higher than those ordinarily reached by thermal reforming. In addition, the yield-octane number relationships realized with these catalysts are much better than are the corresponding relationships obtained in thermal reforming and in most of the prior catalytic reforming processes. By an appropriate selection of operating conditions, these catalysts can be used for a number of weeks and even months without regeneration.

It is an object of the present invention to isomerize low boiling saturated isomerizable hydrocarbons in the presence of an amount of gasoline boiling range hydrocarbons and to simultaneously reform said gasoline boiling range hydrocarbons, said isomerization and reforming being carried out in the presence of hydrogen and a platinum-alumina-combined halogen catalyst.

It is another object of the present invention to suppress the formation of low boiling hydrocarbons, particularly normally gaseous hydrocarbons, and to enhance the yield of low boiling isomerized saturated hydrocarbons by the isomerization of isomerizable hydrocarbons in the presence of hydrogen and certain platinum-containing catalysts by including specific gasoline boiling range hydrocarbons in the charge to the isomerization zone.

It is a further object of this invention to produce isomerized saturated hydrocarbons by processing isomerizable saturated hydrocarbons in admixture with certain hydrocarbon fractions in the presence of hydrogen and a platinum-alumina-combined halogen catalyst.

In one embodiment my invention relates to an improvement in the isomerization of an isomerizable paraffin hydrocarbon in the presence of hydrogen and a catalyst comprising platinum-alumina and combined halogen, said improvement comprising adding to said paraffin to be isomerized a hydrocarbon fraction containing paraffins and naphthenes to effect reforming thereof simultaneously with the isomerization of the isomerizable paraffin hydrocarbon, the paraffins of said added hydrocarbon fraction having a minimum molecular weight of 86 and a maximum molecular weight not greater than 28 more than the molecular weight of said paraffin hydrocarbon to be isomerized, and the naphthenes of said added hydrocarbon fraction having a minimum molecular weight of 84 and a maximum molecular weight not greater than 26 more than the molecular weight of said paraffin hydrocarbon to be isomerized.

In another embodiment my invention relates to a process which comprises contacting a low boiling isomerizable paraffin hydrocarbon, hydrogen, and a hydrocarbon fraction containing paraffins and naphthenes with a catalyst comprising alumina containing from about 0.05 to about 1.5% platinum and combined halogen in an amount not exceeding about 8% at a temperature of from about 650 to 1000° F., and a pressure greater than about 25 p. s. i. a., the paraffins of said added hydrocarbon fraction having a minimum molecular weight of 86 and a maximum molecular weight not greater than 28 more than the molecular weight of said isomerizable paraffin hydrocarbon, and the naphthenes of said added hydrocarbon fraction having a minimum molecular weight of 84 and a maximum molecular weight not greater than 26 more than the molecular weight of said isomerizable paraffin hydrocarbon.

In still another embodiment my invention relates to a process which comprises contacting at a temperature of from about 650 to about 1000° F. and at a pressure greater than about 25 p. s. i. a. a low boiling isomerizable paraffin hydrocarbon, hydrogen, and a higher boiling naphtha fraction rich in naphthenes, the paraffins of said higher boiling naphtha fraction having a minimum molecular weight of 86 and a maximum molecular weight of not greater than 28 more than the molecular weight of said low boiling isomerizable paraffin hydrocarbon, and the naphthenes of said higher boiling naphtha having a minimum molecular weight of 84 and a maximum molecular weight not greater than 26 more than the molecular weight of said low boiling isomerizable paraffin hydrocarbon, with a catalyst prepared by forming an alumina, commingling halogen ions therewith in an amount of from about 0.1% to about 8% by weight of said alumina, thereafter commingling with the mixture a platinum solution in an amount to form a final catalyst containing from about 0.05% to about 1.5% by weight of platinum, and heating the composite at a temperature of from about 800° to about 1200° F.

The low boiling saturated isomerizable hydrocarbons that will be isomerized in accordance with my process include n-butane, n-pentane, n-hexane, and mildly branched paraffins such as 2-methylpentane and the like, or mixtures thereof.

The hydrocarbon stocks that may be reformed simultaneously with isomerization in accordance with my process comprise hydrocarbon fractions containing naphthenes and paraffins. The preferred stocks are those consisting essentially of naphthenes and paraffins although in some cases aromatics and/or olefins also may be present. As hereinbefore stated, the paraffins of said added hydrocarbon fractions will have a minimum molecular weight of 86 and a maximum molecular weight not greater than 28 more than the molecular weight of the low boiling paraffin hydrocarbon to be isomerized and the naphthenes of said added hydrocarbon fraction will have a minimum molecular weight of 84 and a maximum molecular weight not greater than 26 more than the molecular weight of the low boiling paraffin hydrocarbon to be isomerized. Thus, when the low boiling saturated hydrocarbon to be isomerized is normal butane, the hydrocarbon fraction containing naphthenes and paraffins will comprise a six carbon atom fraction containing hexanes as the paraffin constituents and methylcyclopentane and cyclohexane as the naphthene constituents. When the low boiling saturated hydrocarbon to be isomerized comprises normal pentane, the hydrocarbon fraction to be reformed simultaneously therewith will consist of hexanes and heptanes as the paraffinic constituents thereof and methylcyclopentane, cyclohexane, dimethylcyclopentanes, ethylcyclopentane, and methylcyclohexane as the naphthenic constituents thereof. When the low boiling saturated hydrocarbon to be isomerized comprises n-hexane, the hydrocarbon fraction to be reformed simultaneously therewith will consist of hexanes, heptanes, and octanes as the paraffinic constituents thereof, and methylcyclopentane, cyclohexane, dimethylcyclopentanes, ethylcyclopentane, methylcyclohexane, ethylcyclohexane, and dimethylcyclohexanes, as the naphthenic constituents thereof. As hereinabove stated, the low boiling saturated hydrocarbon to be isomerized may comprise a mixture of n-butane and n-pentane, a mixture of n-butane and n-hexane, a mixture of n-pentane and n-hexane, a mixture of n-butane, n-pentane and n-hexane, etc., and in such instances the hydrocarbon fraction to be reformed simultaneously therewith will be limited in molecular weight so that the above limitations are met.

The isomerization of low boiling saturated hydrocarbons is an exothermic reaction. The dehydrogenation reactions of naphthenes which will be carried on simultaneously with the exothermic isomerization reactions are endothermic and thus the exothermicity of the isomerization reactions can be readily controlled by addition of proper amounts of hydrocarbon fractions containing paraffins and naphthenes. The isomerization of a low boiling saturated hydrocarbon cannot be carried out as a practical matter without some simultaneous hydrocracking. Hydrocracking is a highly exothermic reaction. Thus, the efficiency of a particular isomerization reaction can be greatly enhanced by controlling the isomerization zone temperature within certain specified limits thereby simultaneously controlling the hydrocracking reaction. It is, therefore, a further object of this invention to add hydrocarbon fractions to my isomerization process in quantities such that hydrocracking of the low boiling saturated hydrocarbon is minimized and reaction temperatures are controlled. Furthermore, the hydrocracking reaction is hydrogen consuming. When utilizing the catalyst of the present invention in the isomerization process, it is desirable to maintain an atmosphere of hydrogen to extend catalyst life by keeping the catalyst surface clean and to minimize coke formation. Since hydrocracking is a hydrogen consuming reaction, this hydrogen balance within the reaction zone can be maintained in one of two manners. In the first manner, outside hydrogen is supplied to balance the amount of hydrogen consumed by the hydrocracking reaction which occurs concurrently with the desired isomerization of the low boiling saturated hydrocarbon. In many instances, there is no available supply of outside hydrogen and therefore the isomerization process becomes uneconomical due to a lack of proper hydrogen balance. In a second manner, the hydrogen necessary to maintain proper balance can be supplied by the addition of hydrocarbon fractions containing paraffins and naphthenes and carrying out the reforming of said fractions simultaneously with the desired isomerization, thereby maintaining hydrogen balance in the process. It is a further object of this invention to supply said hydrocarbon fractions rich in naphthenes in such quantities so that hydrogen production will not exceed 100 cubic feet of hydrogen per barrel for the total process and preferably will not exceed 50 cubic feet of hydrogen per barrel. By such means, the process of my invention can be utilized in an economical manner in the absence of an external hydrogen source.

The catalysts that may be used in my process comprise platinum-alumina-combined halogen catalysts of the type described in U. S. Patent No. 2,479,109, issued August 16, 1949. These catalysts may contain substantial amounts of platinum, but, for economic as well as for product yield and quality reasons, the platinum content usually will be within the range of from about 0.05% to about 1.5%. The catalysts will contain a relatively minor amount, usually less than about 8% on a dry alumina basis, of a halogen, especially fluorine or chlorine. One method of preparing such catalysts comprises adding a suitable alkaline reagent such as ammonium hydroxide or carbonate to a salt of aluminum, such as aluminum chloride, aluminum sulfate, aluminum nitrate, and the like, in an amount sufficient to form aluminum hydroxides, which upon drying, are converted to alumina. The halogen may be added to the resultant slurry in the form of an acid such as hydrogen fluoride or as a salt such as ammonium chloride. The fluoride ion appears to be somewhat more active in promoting hydrocracking and isomerization than other members of the halide group and, therefore, smaller amounts of this particular halide ordinarily are employed. Platinum may be added to the alumina by adding hydrogen sulfide to chloroplatinic acid solution, commingling the resulting solution with the halogen-containing alumina, and thereafter heating the resultant composite at a temperature of from about 800° to about 1200° F. In general, the platinum-alumina-combined halogen catalysts that I use contain about 0.1–1.0% platinum and about 0.1–1.0% combined fluorine and/or combined chlorine.

The operating conditions maintained in my process, when it is desired to produce isomerized hydrocarbons from lower boiling saturated isomerizable hydrocarbons should be such that substantial conversion of straight chain paraffins to their more highly branched chain isomers is induced as well as appreciable conversion of naphthenes to aromatics while minimizing hydrocracking of lower and higher boiling paraffins. The operating conditions will ordinarily lie within the following ranges: temperature—from about 650 to 1000° F.; pressures—greater than about 25 p. s. i. a. and preferably not greater than about 500 p. s. i. a., although higher pressures up to about 1000 p. s. i. a. may be utilized; hydrogen-hydrocarbon mol ratio—greater than about 0.5 and usually between about 2 and 6; and weight hourly space velocity, defined as the weight of hydrocarbon charge per hour per weight of catalyst in the reaction zone—from about 0.5 to about 40, although lower weight hourly space velocities from about 1 to 5 are preferred. When the lower boiling saturated hydrocarbon being processed in conjunction with the hydrocarbon fraction comprises n-butane, the pressure will ordinarily be 500 pounds or lower since lower pressures favor the isomerization of n-butane. In some instances it may even be desirable to use pressures in the order of 100–250 p. s. i. a. Somewhat higher pressures ordinarily will be employed when processing the higher boiling isomerizable saturated hydrocarbons, i. e., n-pentane and n-hexane.

Hydrocarbons may be isomerized and simultaneously reformed in accordance with my process using fluidized, fixed bed, suspensoid, and moving bed types of processes. However, I prefer to use fixed bed operations primarily because processes of this type tend to minimize attrition losses of the relatively expensive catalysts. One fixed bed method of conducting my invention comprises preheating hydrogen and the hydrocarbon charging stocks to a conversion temperature, and passing the same through a plurality of substantially adiabatic reaction zones containing the platinum-alumina-combined halogen catalyst. In some instances where high ratios of hydrocarbon fraction to lower boiling isomerizable saturated hydrocarbon are utilized, the reaction may be endothermic, hence the reactant stream passing between said zones may be reheated to the desired temperature. The isomerized and reformed hydrocarbons are recovered and the hydrogen is separated and recycled to the reaction zone. Another type of fixed bed process that is suitable for certain types of operation comprise passing the hydrocarbon charging stocks together with the hydrogen through tubes containing catalyst, said tubes being subjected to radiant heat from a radiant flame and the resulting hot products of combustion. Here again, the isomerized hydrocarbons and the reformate are recovered and hydrogen is separated and recycled to the reaction zone.

When producing large proportions of isomerized hydrocarbons, with a resultant high exothermicity, beneficial temperature effects may be obtained by injecting the higher boiling hydrocarbon fraction containing paraffins and naphthenes at the plurality of different points along the catalyst bed. This type of operation tends to maintain a more consistent temperature throughout the bed. When a plurality of substantially adiabatic reaction zones are employed, it sometimes is desirable to add the higher boiling hydrocarbon fraction to the reaction mixture flowing between the stages.

Further features and advantages of my process will become apparent from a description of the flow diagram shown in the figure. In the figure, a methylcyclopentane-cyclohexane straight-run naphtha fraction is passed through line 1, is picked up by pump 2 and is discharged into line 3 containing valve 4. A recycle stream of hydrogen prepared as hereinafter described, flowing through line 5 containing valve 6, joins the straight-run naphtha fraction and the commingled mixture passes into heater 7. The mixture is raised to a temperature of 650–1000° F. and is then withdrawn from heater 7 through line 8. n-Butane is passed through line 9, is picked up by compressor 10, and is discharged into line 11 containing valve 12. It is joined by a stream of recycle light hydrocarbons passing through line 13 containing valve 14. Alternatively, it is joined by a stream of recycled n-butane flowing through line 40. The commingled mixture of the light hydrocarbon fraction and the n-butane is passed to heater 7 and is heated to the desired reaction temperature. It is withdrawn from the heater through line 15, is joined by the preheated methylcyclopentane-cyclohexane naphtha fraction and hydrogen, and passes into reactor 16.

A single adiabatic reactor is shown in this particular illustration, although 2, 3, or 4 adiabatic reactors with heaters (if needed) will be employed. The reactor contains a bed of ⅛" x ⅛" pellets of platinum-alumina-combined halogen catalyst having a platinum content of 0.3% and a fluorine content of 0.3%. The pressure in the reactor is maintained at 350 p. s. i. a. An appreciable portion of the n-butane is isomerized to isobutane as the charging stock passes through the catalyst bed. At the same time the methylcyclopentane is isomerized to cyclohexane and this along with cyclohexane in the charge is dehydrogenated to benzene coupled with some hydrocracking of the higher boiling paraffins to lower boiling paraffins.

The reaction mixture is withdrawn from reactor 16 through line 17, is passed through cooler 18, then through line 19, into receiver 20. A gaseous stream predominating in hydrogen is withdrawn from receiver 20 through line 21, is picked up by compressor 22 and is discharged into line 5, from whence it is returned to heater 7 and reactor 16. Excess hydrogen may be withdrawn through line 23 containing valve 24 or, in some cases, for example during startup, make-up hydrogen may be added to the system through line 23.

Substantially hydrogen-free hydrocarbons are withdrawn from receiver 20 through line 25 containing valve 26 and are discharged into stabilizer 27. Reformate of the desired vapor pressure is withdrawn from the stabilizer through line 28 containing valve 29 and is sent to storage. A light hydrocarbon fraction is removed overhead from stabilizer 27 through line 30. This fraction contains methane and ethane, but predominates in propane. If desired, a portion of this fraction may be recycled to the reactor via line 31 containing valve 32, compressor 33, and line 13. Recycle of this material to the reaction zone tends to suppress the formation of methane, ethane, and propane during the course of the reforming action, and thus increases the yield of more valuable gasoline boiling range hydrocarbons, particularly aromatic hydrocarbons. It also affords a means for controlling the extent of hydrocracking of the gasoline hydrocarbons, hydrocracking decreasing with increasing recycle. Another method of operation comprises operating the stabilizer to remove substantially all of the normal and isobutane overhead. This fraction may then be transferred via line 30 containing valve 34 to deisobutanizer 35. Isobutane will be removed overhead through line 36 containing valve 37 and normal butane may be withdrawn from the bottom of the fractionator through line 38, compressor 39, and line 40 containing valve 41, and recycled via the heater to the reaction zone to obtain increased conversion of n-butane to isobutane. An isobutane-n-butane fraction which may have been separated from a straight-run gasoline from which the methylcyclopentane-cyclohexane hydrocarbon was obtained, may be discharged to deisobutanizer 35 via line 42 containing valve 43 to prepare additional n-butane to be isomerized.

If desired, a recycle stream of n-pentane or a combined stream of n-butane and n-pentane may be returned to the reaction zone for isomerization therein.

The following example is given to illustrate my invention, but it is not included for the purpose of unduly limiting the scope of said invention.

EXAMPLE

The experiments listed in the following table were made by passing heated hydrogen and hydrocarbon charging stock through a 50 cc. catalyst bed contained in a ⅞" I. D. reactor tube surrounded by heating elements. The catalyst comprised 0.3% platinum, 0.38% chlorine, and 0.15% fluorine on alumina. Experiments 1–3 were made at a space velocity of 2, and Experiments 4–6 were made at a space velocity of 1. Experiments 1 and 4 were made with a charging stock that consisted of a 50–50 volume blend of normal pentane and 150°–190° F. straight-run naphtha fraction, rich in methylcyclopentane, cyclohexane and methylcyclohexane. The remaining experiments were made with 150°–190° F. straight-run naphtha, i. e., no normal pentane was present. The operating conditions and results are shown in the following table:

Table

| Experiment No. | 1 | 2 | 3 | 4 | 5 | 6 |
|---|---|---|---|---|---|---|
| Charge stock: | | | | | | |
| 50-50 volume blend of n-pentane and 150-190° F. straight-run naphtha | X | | | X | | |
| 150-190° F. straight-run naphtha | | X | X | | X | X |
| Liquid hourly space velocity | 2 | 2 | 2 | 1 | 1 | 1 |
| Pressure, p. s. i. g. | 225 | 225 | 225 | 225 | 225 | 225 |
| Hydrogen/hydrocarbon molal ratio | 3 | 3 | 3 | 3 | 3 | 3 |
| Temperatures, ° C.: | | | | | | |
| Block | 490 | 490 | 500 | 470 | 470 | 480 |
| Average catalyst | 473 | 460 | 468 | 465 | 457 | 468 |
| Yields: | | | | | | |
| i-Pentane, weight percent of total charge | 24.0 | <1.0 | <1.0 | 24.8 | <1.0 | <1.0 |
| i-Pentane, weight percent of C₅ charge | 51.7 | | | 53.4 | | |
| n-Pentane, weight percent of total charge | 19.4 | <1.0 | <1.0 | 17.0 | <1.0 | <1.0 |
| n-Pentane, weight percent of C₅ charge | 41.8 | | | 36.6 | | |
| Benzene, weight percent of 150-190° F. fraction | 48 | 38 | 41 | 45 | 39 | 44 |
| Toluene, weight percent of 150-190° F. fraction | 16 | 12 | 13 | 14 | 13 | 15 |
| Total aromatics, weight percent of 150-190° F. fraction | 64 | 50 | 54 | 59 | 52 | 59 |

These results illustrate the following points:

(1) Over half of the normal pentane charged was converted to isopentane, that is, isomerized.

(2) There was a very appreciable conversion of naphthenes to aromatics in each of the experiments.

(3) A comparison of Experiment 1 with Experiment 2, and of Experiment 4 with Experiment 5, shows that the naphthenes acted as a temperature controlling medium, in that they maintained the average catalyst temperature at a lower value, which results in less hydrocracking.

(4) A comparison of Experiment 6 with Experiment 4, and of Experiment 3 with Experiment 1, shows that the effectiveness of naphthenes as a temperature-control medium is greater at the lower space velocity.

(5) A comparison of Experiment 1 with Experiment 6 shows that the presence of normal pentane in the charging stock did not reduce the capacity of the unit. In these two experiments the rate at which the 150-190° F. naphtha was charged was the same. Somewhat higher yields were obtained in Experiment 1, although if the average catalyst temperature were reduced from 473° to 468° that prevailed in Experiment 6, the yields probably would have been nearly identical. Therefore, with the same naphtha charge rates, substantially the same yields of aromatics were obtained. However, in Experiment 1 an equal volume of normal pentane was processed and over 50% of this was converted to isopentane. Thus, it can be seen that the presence of a low boiling isomerizable saturated hydrocarbon in the charging stock does not reduce the capacity of the plant.

Life tests have indicated that the presence of appreciable quantities of low boiling saturated isomerizable hydrocarbons in the charging stock increases the catalyst life, i. e., a greater number of barrels of total hydrocarbons can be processed over a given quantity of catalysts if the charging stock contains low boiling saturated isomerizable hydrocarbons. The exact reason or reasons for this effect are not known, although it may be that it is due to a lowering of the average molecular weight of the charging stock.

From the foregoing description, it can be seen that I have invented a process whereby low boiling saturated isomerizable hydrocarbons are isomerized to their more valuable isomers and relatively narrow boiling range gasoline fractions are converted to aromatics or aromatic concentrates. The inclusion of the isomerizable hydrocarbons in the feed to the unit does not adversely affect the reforming capacity and, in addition, it tends to reduce the carbon forming tendency of the reforming charge stock, thus giving a greater catalyst life. For these reasons, and because the presence of the naphthenic hydrocarbons decreased the catalyst temperature increase due to isomerization, less catalyst is required to accomplish a given amount of isomerization and reforming in my process than is required when the two reactions are conducted independently. Furthermore, the presence of appreciable quantities of low boiling hydrocarbons in the reactor feed often tends to suppress the formation of such hydrocarbons from the reforming charge, thereby increasing the yield of reformate.

I claim as my invention:

1. In the isomerization of an isomerizable paraffin hydrocarbon of from 4 to 6 carbon atoms per molecule in the presence of hydrogen and in the presence of a catalyst comprising platinum, alumina, and combined halogen, the improvement which comprises adding to said hydrocarbon to be isomerized a substantial amount of a hydrocarbon fraction containing paraffins and naphthenes to effect reforming thereof simultaneously with the isomerization of the isomerizable paraffin hydrocarbon, the paraffins of said added hydrocarbon fraction having a minimum molecular weight of 86 and a maximum molecular weight not greater than 28 more than the molecular weight of said paraffin hydrocarbon to be isomerized and the naphthenes of said added hydrocarbon fraction having a minimum molecular weight of 84 and a maximum molecular weight not greater than 26 more than the molecular weight of said paraffin hydrocarbon to be isomerized, the amount of said added hydrocarbon fraction containing paraffins and naphthenes being such that dehydrogenation of the naphthenes therein will maintain the isomerization process in hydrogen balance and produce not more than 100 cubic feet per barrel of excess hydrogen.

2. In the isomerization of n-pentane in the presence of hydrogen and in the presence of a catalyst comprising platinum, alumina, and combined halogen, the improvement which comprises adding to said n-pentane a substantial amount of a hydrocarbon fraction containing paraffins and naphthenes to effect reforming thereof simultaneously with the isomerization of said n-pentane, the paraffins of said added hydrocarbon fraction having a minimum molecular weight of 86 and a maximum molecular weight not greater than 28 more than the molecular weight of said n-pentane and the naphthenes of said added hydrocarbon fraction having a minimum molecular weight of 84 and a maximum molecular weight not greater than 26 more than the molecular weight of said n-pentane, the amount of said added hydrocarbon fraction containing paraffins and naphthenes being such that dehydrogenation of the naphthenes therein will maintain the isomerization process in hydrogen balance and produce not more than 100 cubic feet per barrel of excess hydrogen.

3. In the isomerization of an isomerizable paraffin hydrocarbon of from 4 to 6 carbon atoms per molecule in the presence of hydrogen and in the presence of a catalyst comprising platinum, alumina, and combined halogen, the improvement which comprises adding to said hydrocarbon to be isomerized a substantial amount but not more than 50% by volume of a hydrocarbon fraction containing paraffins and naphthenes to effect reforming thereof simultaneously with the isomerization of the isomerizable paraffin hydrocarbon, the paraffins of said added hydrocarbon fraction having a minimum molecular weight of 86 and a maximum molecular weight not greater than 28 more than the molecular weight of said paraffin hydrocarbon to be isomerized and the naphthenes of said added hydrocarbon fraction having a minimum molecular weight of 84 and a maximum molecular weight not greater than 26 more than the molecular weight of said paraffin hydrocarbon to be isomerized, the amount of said added hydrocarbon fraction containing paraffins and naphthenes being such that dehydrogenation of the naphthenes therein will maintain the isomerization process in hydrogen balance and produce not more than 100 cubic feet per barrel of excess hydrogen.

4. In the isomerization of n-pentane in the presence of hydrogen and in the presence of a catalyst comprising platinum, alumina, and combined halogen, the improvement which comprises adding to said n-pentane a substantial amount but not more than 50% by volume of a hydrocarbon fraction containing paraffins and naphthenes to effect reforming thereof simultaneously with the isomerization of said n-pentane, the paraffins of said added hydrocarbon fraction having a minimum molecular weight of 86 and a maximum molecular weight not greater than 28 more than the molecular weight of said n-pentane and the naphthenes of said added hydrocarbon fraction having a minimum molecular weight of 84 and a maximum molecular weight not greater than 26 more than the molecular weight of said n-pentane, the amount of said added hydrocarbon fraction containing paraffins and naphthenes being such that dehydrogenation of the naphthenes therein will maintain the isomerization process in hydrogen balance and produce not more than 100 cubic feet per barrel of excess hydrogen.

5. The process of claim 1 further characterized in that said isomerizable paraffin is n-butane.

6. The process of claim 1 further characterized in that said isomerizable paraffin is n-hexane.

7. The process of claim 3 further characterized in that said isomerizable paraffin is n-butane.

8. The process of claim 3 further characterized in that said isomerizable paraffin is n-hexane.

References Cited in the file of this patent

UNITED STATES PATENTS

| | | |
|---|---|---|
| 2,266,012 | D'Ouville et al. | Dec. 16, 1941 |
| 2,314,297 | Watson | Mar. 16, 1943 |
| 2,324,762 | Calhoun et al. | July 20, 1943 |
| 2,345,096 | Burk et al. | Mar. 28, 1944 |
| 2,399,927 | Howes et al. | May 7, 1946 |
| 2,406,721 | Veltman | Aug. 27, 1946 |
| 2,479,110 | Haensel | Aug. 16, 1949 |
| 2,490,287 | Welty | Dec. 6, 1949 |
| 2,708,187 | Kearby | May 10, 1955 |

OTHER REFERENCES

Komarewsky et al.: "Oil and Gas Journal," January 24, 1943, pages 90–93 and 119.